March 22, 1960     K. L. JONES     2,929,654
TRAILER HOUSE PORCHES AND STEPS
Filed July 25, 1958     2 Sheets-Sheet 1
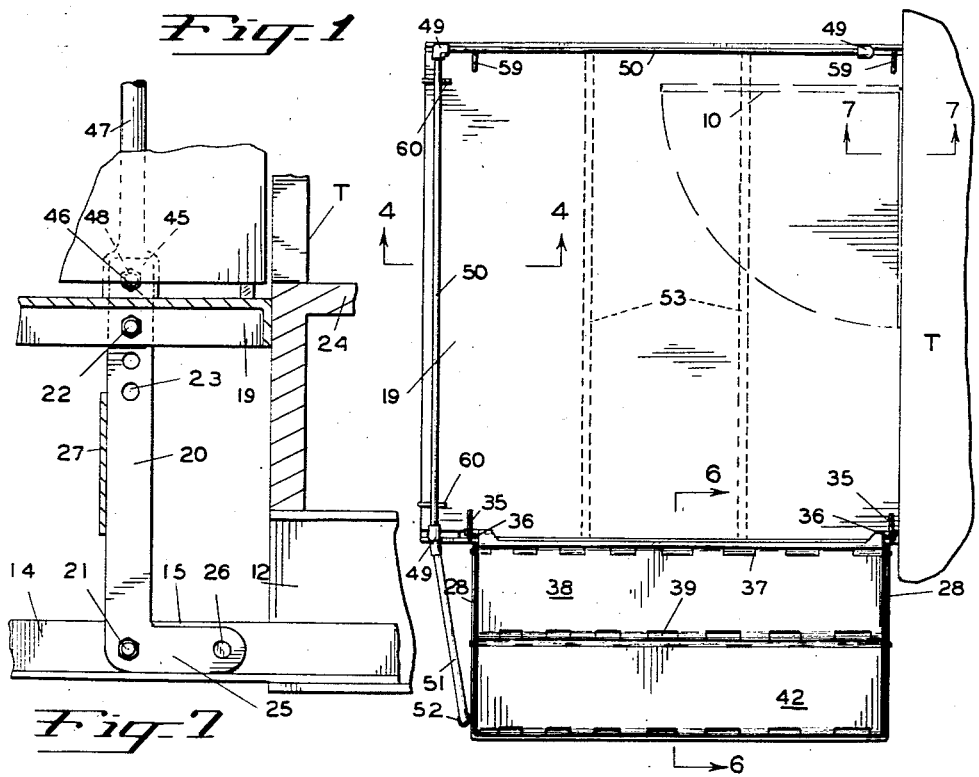
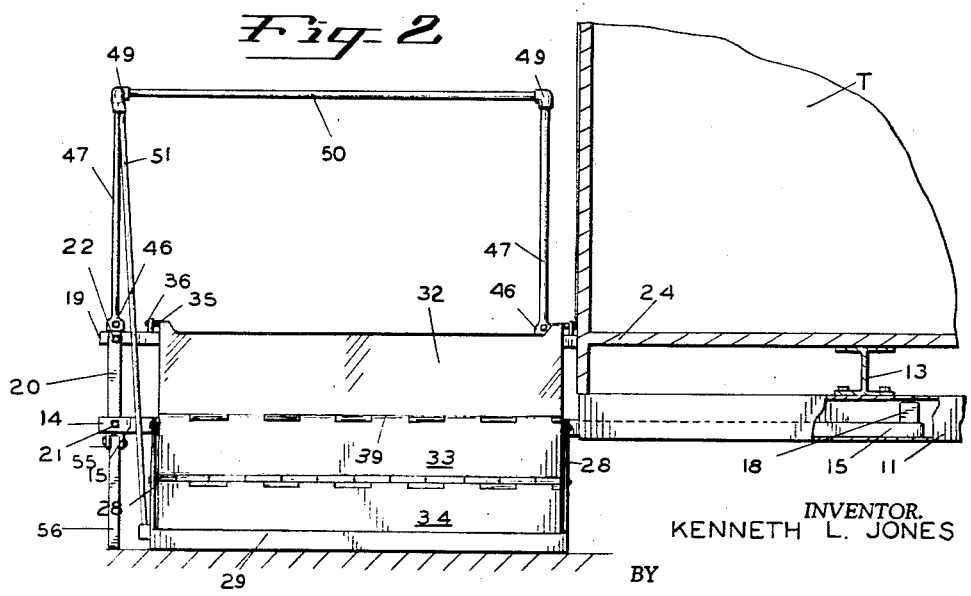
INVENTOR.
KENNETH L. JONES
BY
Kimmel & Crowell
ATTORNEYS

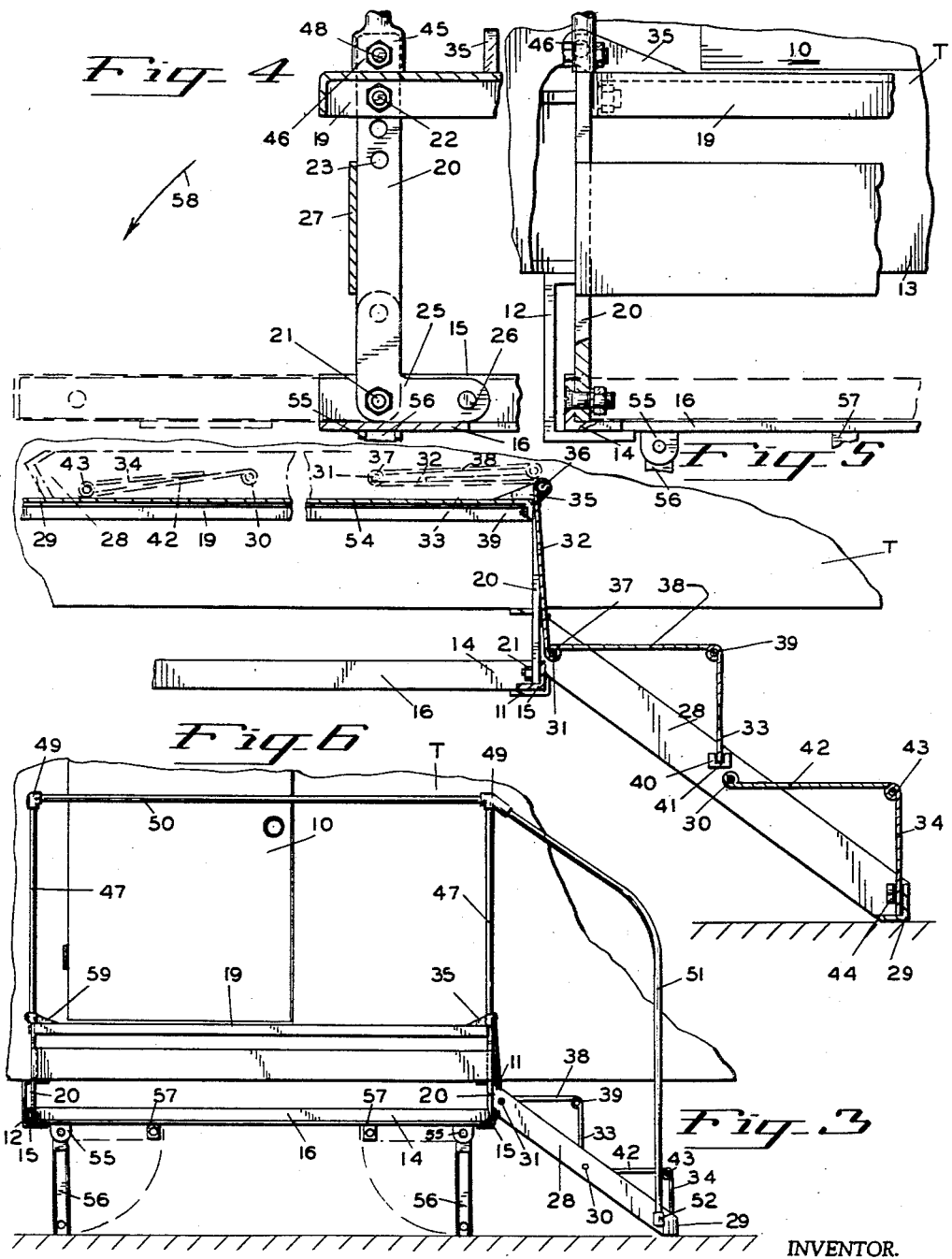

United States Patent Office 2,929,654
Patented Mar. 22, 1960

2,929,654

TRAILER HOUSE PORCHES AND STEPS

Kenneth L. Jones, Estacada, Oreg.

Application July 25, 1958, Serial No. 750,916

4 Claims. (Cl. 296—23)

The present invention relates to porches and steps for trailer houses.

The primary object of the invention is to provide a storable porch for trailers with steps combined therewith, the structure of the porch and steps being such that they can be folded up and stored under the trailer house while moving the trailer house from place to place.

A further object of this invention is to provide a porch and folding step combination that is easy to erect by one person with a minimum of tools.

Other objects and advantages will become apparent in the following specification when considered in the light of the attached drawings, in which:

Figure 1 is a plan view of the invention shown in extended position.

Figure 2 is an elevation of the invention illustrating in section a fragmentary portion of the trailer and the means mounting the assembly thereto.

Figure 3 is a front elevation of the porch.

Figure 4 is an enlarged fragmentary sectional view, taken on the line 4—4 of Figure 1, looking in the direction of the arrows.

Figure 5 is an enlarged fragmentary detail view.

Figure 6 is a fragmentary enlarged sectional view, taken on the line 6—6 of Figure 1, looking in the direction of the arrows.

Figure 7 is a fragmentary enlarged detail sectional view, taken on the line 7—7 of Figure 1, looking in the direction of the arrows.

Referring now to the drawings in detail wherein like reference numerals indicate like parts throughout the several figures, the reference character T indicates generally a conventional trailer house to which the invention is attached. The door of the trailer house T is indicated by the numeral 10 and is shown in closed position, the open position being indicated by broken lines, referring to Figure 1 and open in solid lines in Figure 7.

In making the trailer T ready to receive the invention, channels 11 and 12 are mounted to the underside of the lower framework 13 thereof. The channels 11 and 12 may extend completely across the trailer T with the length of the channels 11 and 12 depending upon the size of porch to be mounted thereto.

Slidably mounted within the channels 11 and 12 is a rectangular frame 14. The frame 14 includes angle side rails 15 spaced apart and joined together by transverse members 16. The frame 14 is arranged to slide within the channels 11 and 12. The inner ends of the angle bars 15 extend upwardly at 18 and hold the frame 14 in a horizontal position when in extended position.

The porch includes a platform 19 pivotally mounted on upwardly extending legs 20 which are pivotally mounted at their lower ends by pivot pins 21 to the side rails 15, referring particularly to Figures 4, 5 and 7. The platform 19 is pivotally mounted by the pivot pins 22 engaged in a selected one of the holes 23. The object of the series of holes 23 in the legs 20 is to adapt the level of the platform 19 to the floor 24 of the trailer, as it is desirable to maintain the level of the platform 19 slightly below the bottom of the door 10.

The lower ends of the legs 20 each have a right angle extension 25, which is releasably locked to the side rails 15 by bolts or pins 26. This maintains the platform 19 in raised position. Side sway of the legs 20 is prevented by a transverse member 27 which bridges between the legs 20 and is secured thereto.

Folding steps are secured to the porch and include side rails 28 tied together at their lower ends by transverse angle member 29. The rails 28 are further spaced apart by transverse rods 30 and 31. Vertical risers 32, 33 and 34 extend between the rails 28. The upper edge of the riser 32 is pivotally secured to ears 35 on the platform 19 by the bolts 36. The lower edge of the riser 32 is formed into a piano-type hinge 37 journalled on the transverse rod 31.

A horizontally disposed step 38 is also hingedly secured to the rod 31 and extends horizontally forwardly therefrom terminating in a piano-hinge 39 connecting it to the upper edge of the riser 33. The lower edge 40 of the riser 33 rests within the side pockets 41, forming part of the rails 28.

Another horizontally disposed step 42 is hingedly mounted to the transverse rod 30 and extends horizontally forwardly therefrom terminating in the hinge 43 connecting it to the upper edge of the riser 34. The lower edge of the riser 34 rests upon the transverse angle member 29 and behind the stop 44. The riser and steps are shown in solid structure in this drawing. They could be made from grating. The risers could be of much lighter material than the steps themselves, but it should be made preferably of a non-skid material.

The upper ends 45 of the legs 20 extend above the platform 19 and receive enlarged ends 46 of the vertically disposed legs 47 secured thereto by the bolts 48. The upper ends of the legs 47 have fittings 49 into which guard rails 50 enter, and are held therein by suitable locking means. The lower end of the rail 51 is arranged to enter the socket 52 forming part of the lower end of the side rail 28 of the steps.

Referring particularly to Figure 1, broken lines 53 indicate the transverse supporting members giving rigidity to the platform 19. These are shown in full lines at 54, Figure 6.

Ears 55 form part of the transverse member 16 and having folding legs 56 pivotally connected thereto, referring to Figure 3. The legs 56 help to support the weight of the platform 19, as shown in the drawings.

In the use and operation of the invention, starting from the position shown in the drawings, first the rails 50, 51 and the legs 47 are disassembled. Next the step rails 28 are folded up over onto the platform 19, as indicated by the broken lines in Figure 6. The riser 32 hinges about the pivot bolts 36, the step 38 is folded over as indicated, while the riser 33 is folded as indicated. The step 42 is folded, together with the riser 34 as indicated by the broken line in Figure 6. This provides a minimum of depth for storage. The locking pin 26 is removed and the legs 20 lowered as indicated by the arrow 58 to the broken line position, as indicated in Figures 4 and 5.

Next the legs 56 are folded to the broken line position, referring to Figure 3, and held in position by the clips 57. The hand railing 50 may be placed on top of the platform 19 at any convenient location. The operator then pushes the frame 14, including the platform 19 towards the trailer T, which causes the frame 14 to travel along within the channels 11 and 12 until the outer end of the platform 19 has reached a position within the confines of the trailer T. Any suitable means (not shown) may be provided for holding the platform 19 in this retracted position while moving the trailer T from place to place.

In the event that it is desirable to have the steps mounted on the opposite side of the platform 19, additional ears 59 are provided for receiving the step assembly. In rare cases the steps may be mounted to the outer end directly in line with the door 10 of the trailer by being secured to ears 60.

Having thus described the preferred embodiment of the invention, it should be understood that numerous structural modifications and adaptations may be resorted to without departing from the scope of the appended claims.

What is claimed is:

1. A storable porch for trailers comprising a transversely extending horizontal track secured in underlying relation to said trailer, a horizontally transversely slidable frame mounted for movement on said track from a position underlying said trailer to a position extending laterally of said trailer, a platform overlying said frame, a plurality of parallel legs pivotally secured at one end to said frame and at the other end to said platform securing said platform to said frame for vertical adjustment thereon, and a plurality of folding steps secured to said platform and foldable thereon.

2. A device as claimed in claim 1 wherein means are provided for adjustably securing said platform to said legs to vary the vertical adjustment of said platform with respect to said frame.

3. A device as claimed in claim 1 wherein railings are detachably secured to said platform in vertically spaced relation thereabove.

4. A device as claimed in claim 1 wherein folding support legs are detachably secured to the outer end of said frame for supporting said frame from the ground.

References Cited in the file of this patent

UNITED STATES PATENTS

| | | |
|---|---|---|
| 2,122,791 | Bollstrom | July 5, 1938 |
| 2,193,352 | Thomas | Mar. 12, 1940 |
| 2,274,754 | Theisen | Mar. 3, 1942 |
| 2,786,710 | Chapman | Mar. 26, 1957 |